Figure 1:
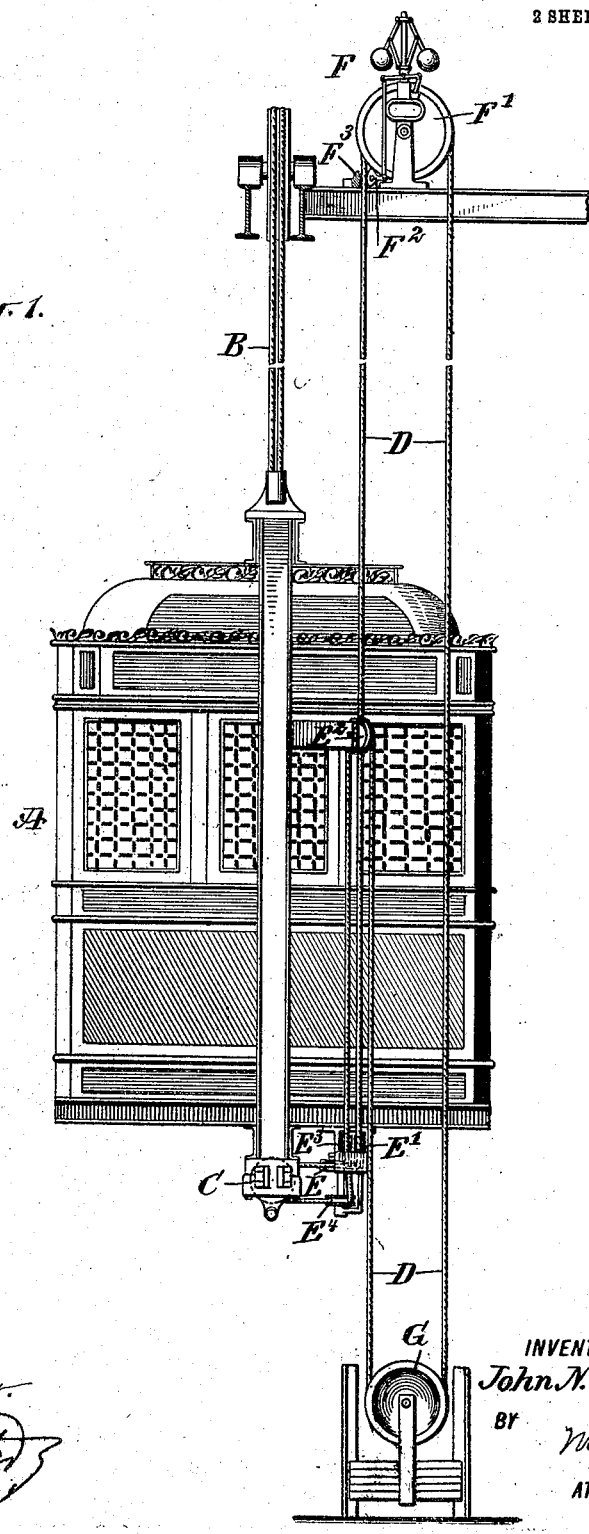

J. N. ANDERSON.
SAFETY DEVICE FOR ELEVATORS.
APPLICATION FILED FEB. 17, 1905.

900,074.

Patented Oct. 6, 1908.

WITNESSES:

INVENTOR
John N. Anderson
BY
ATTORNEYS

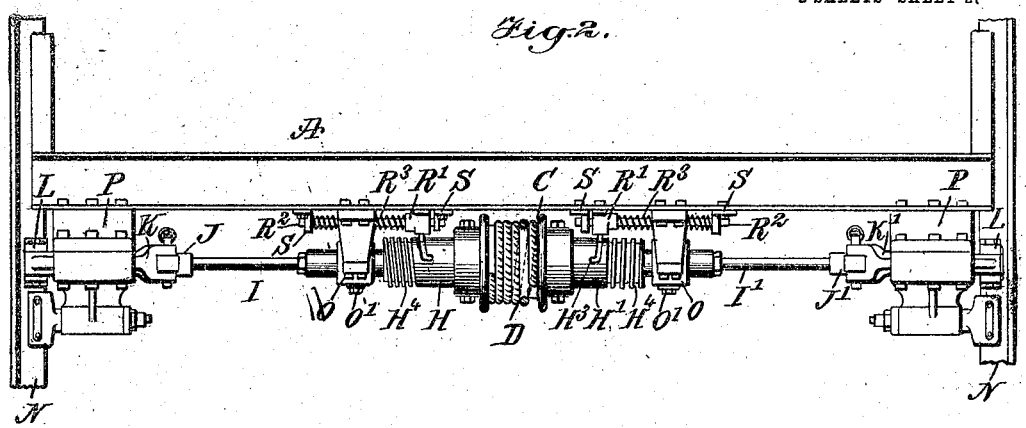
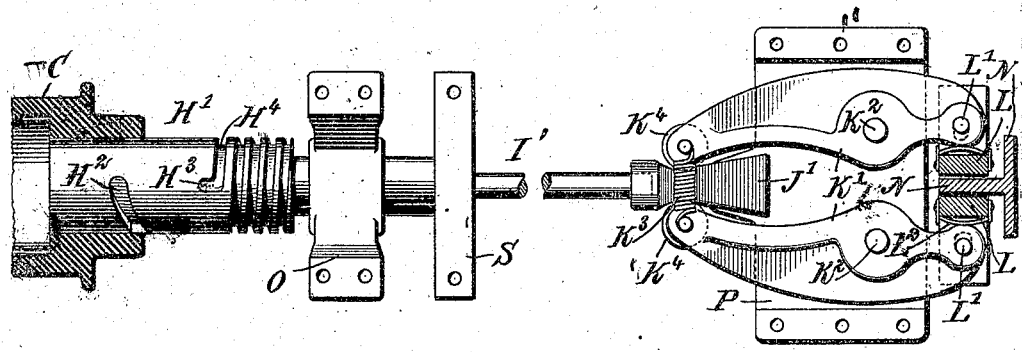
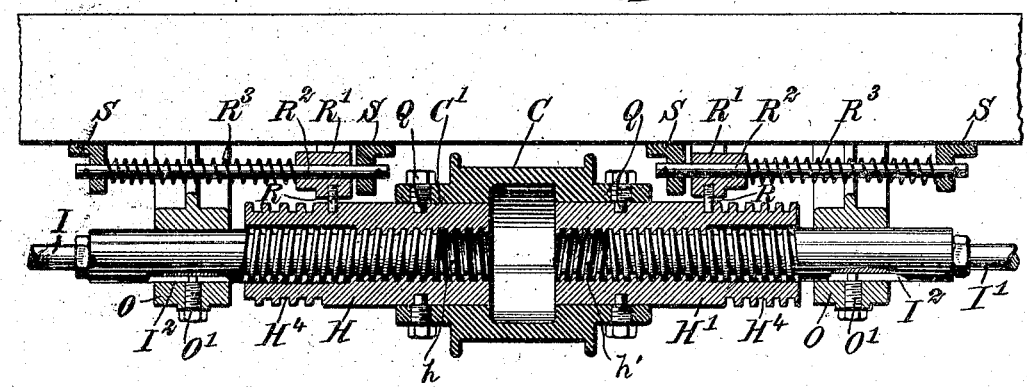

UNITED STATES PATENT OFFICE.

JOHN N. ANDERSON, OF NEW YORK, N. Y., ASSIGNOR TO CHARLES W. HOFFMAN, OF NEW YORK, N. Y.

SAFETY DEVICE FOR ELEVATORS.

No. 900,074.  Specification of Letters Patent.  Patented Oct. 6, 1908.

Application filed February 17, 1905. Serial No. 246,022.

*To all whom it may concern:*

Be it known that I, JOHN N. ANDERSON, a citizen of the United States, and a resident of the city of New York, borough of Manhattan, in the county and State of New York, have invented a new and Improved Safety Device for Elevators, of which the following is a full, clear, and exact description.

The object of the invention is to provide a new and improved safety device for elevators, arranged to bring the cage gradually to a stop without shock or jar in case the car exceeds its normal speed, the arrangement being such that the cage comes to a stop before it has acquired too much momentum in its fall.

The invention consists of novel features and parts and combinations of the same, as will be more fully described hereinafter and then pointed out in the claims.

A practical embodiment of the invention is represented in the accompanying drawings forming a part of this specification, in which similar characters of reference indicate corresponding parts in all the views.

Figure 1 is a side elevation of the improvement as applied; Fig. 2 is an enlarged side elevation of the lower portion of the cage provided with the improvement; Fig. 3 is an enlarged plan view of the same, parts being in section; and Fig. 4 is a sectional side elevation of the same.

The safety device illustrated in the drawings is shown applied to a cage A hung on a suspension-cable B for raising or lowering the cage in the usual manner. On the under side of the cage A is arranged a cylindrical drum or pulley C on which are secured the ends of a safety rope or cable D for operating the safety device in case the cage travels at an abnormal rate of speed, the said safety rope extending from the pulley C around idlers E and E' up to and around the pulley F' of a governor F of any approved construction, adapted to actuate a clamping jaw F² for pressing the safety rope D against a fixed jaw F³ whenever the cage A runs beyond a normal rate of speed. The safety rope D, after passing around the pulley F', extends down and around a weighted pulley G and then up over an idler E² and down over idlers E³ and E⁴ back to the pulley C. The several idlers E, E', E², E³ and E⁴ are journaled on the cage A, so that the safety rope D, under normal conditions, travels with the cage A, and thus rotates the pulley F' of the governor F.

In the ends of the hub C' of the drum C are mounted to slide and to turn cylindrical nuts H and H' having left and right hand screw-threads $h$ and $h'$, in which screw the correspondingly threaded ends of screw-rods I and I' provided with wedge-shaped heads J and J' for actuating sets of brake-levers K and K' carrying shoes L for engaging vertically-disposed guides N fixed in the elevator-shaft in the usual manner.

The screw-rods I and I' are mounted to slide longitudinally in bearings O secured to the under side of the cage A, and each of the said bearings O is provided with a pin O', projecting into a longitudinally-extending groove I² formed in the corresponding screw-rod I, so as to allow the latter to slide in the direction of its length, but to prevent it from turning.

The levers K or K' of each set of levers are fulcrumed at K² in bearings P secured to the under side of the cage A, and the inner ends of the levers of a set of levers K or K' are connected with each other by a spring K³, so as to hold friction rollers K⁴, journaled on the inner ends of the levers, in contact with the beveled sides of the heads J and J', as plainly illustrated in Fig. 3.

The brake-shoes L are provided at their shanks with elongated slots through which extend pivots L' held on the brake-levers K and K', to allow a sliding motion of the brake-shoes on the said pivots L' toward and from the guides N. Bow-springs L² are interposed between the brake-shoes and the free ends of the levers, to yieldingly hold the brake-shoes L in frictional contact with the guides N when the levers of the corresponding set of levers K or K' are actuated, as hereinafter more fully described.

On the ends of the hub C' of the drum C are secured or formed lugs Q, projecting into cam-grooves H² formed in the peripheral faces of the nuts H and H' (see Fig. 3), so that when an initial turning movement is given to the drum C, then the said lugs Q cause the nuts H and H' to slide bodily toward each other in the direction of the axis of the drum. By this movement given to the nuts H and H', the screw-rods I and I' are carried bodily along, so that the heads J and J' quickly actuate the sets of brake-levers K and K', to engage the brake-shoes L with the guides N, with a view to prevent the cage from falling too far and acquiring too much momentum, in case the cage exceeds its normal speed.

In order to prevent the nuts H and H' from turning during the preliminary quick application of the brake-shoes just described, the following device is provided: In the peripheral face of each nut H and H' is formed a longitudinally-extending groove H³, terminating at its outer end in a spiral groove H⁴, and into the grooves H³ of the nuts H and H' project pins or lugs R, secured on collars R' held loosely on rods R² fixed in bearings S secured on the under side of the cage A, the said collars R' being pressed on by springs R³ coiled on rods R², resting with one end on one of the bearings and at the other end on the corresponding collar R'.

The operation is as follows: Normally the brake-shoes L of each set of brake-levers K and K' are out of engagement with the guides N, but in case of accident the brake-shoes L are moved quickly in engagement with the guides N, so as to prevent the cage A from falling a great distance, it being understood that when the cage travels beyond a normal rate of speed then the governor F clamps the safety-rope D, so that the latter begins to turn the drum C, whereby the lugs Q in engagement with the grooves H² cause a bodily and longitudinally inward sliding of the nuts H and H', screw-rods I and I' and the heads J and J', to actuate the brake-levers K and K', to move the brake-shoes L in engagement with the guides N. When the lugs R reach the end of the grooves H³, then the nuts are released and free to turn, and a further turning of the drum C now causes the lugs Q to turn the nuts H and H', to cause the screw-rods I and I' to screw inwardly toward each other in the said nuts H and H', but this movement takes place more slowly than the one previously described but more powerfully, so that the heads J and J' actuate the sets of levers K and K', to press the brake-shoes L gradually more powerfully in contact with the guides N, to bring the cage to a final stop. During the first quarter-turn given to the drum C as above described, the shoes are moved into contact with the guides N, thereby retarding but not stopping the progress of the cage A, it being understood that during this action the springs L² are somewhat compressed. During further descent of the cage A the levers K and K' act on the springs L² with gradually increasing power, to press the shoes with correspondingly increased power against the guides N until the friction is sufficient to overcome the weight of the cage A. When this takes place the cage comes to a stop, without shock or jar to the occupants or damage to the cage. Should the weight of the cage be so great that the pressure of the springs L² would not be sufficient to stop the cage before the springs are completely flattened out, then the brake-levers K and K' act rigidly on the shoes L, to bring the cage to a stop.

It is understood that during the inward movement given to the brake-shoes L, as above described, the nuts H and H', in sliding toward each other, are held against turning by the action of the pins R projecting into the longitudinal grooves H³, and when the pins R are at the beginning of the spiral grooves H⁴ they allow the nuts H and H' to turn, for the powerful application of the brake-shoes L, as above described.

In order to re-set the device the safety-rope D is first released at the clamping device of the governor F, and then the drum C is rotated in a reverse direction, to unscrew the nuts H and H' on the rods I and I', the pins R now traveling back in the spiral grooves H⁴. When the pins R reach the inner ends of the groove H³, the nuts are held against further unscrewing, but as the drum C is kept turning, the lugs Q now act on the side walls of the cam-grooves H², to shift the nuts bodily outwardly, the nuts carrying the rods I and I' along, so that the heads J and J' allow the springs K² to open the levers K and K', thus moving the shoes L out of engagement with the guides N. During the bodily movement of the nuts H and H', as above described, the pins R travel back in the grooves H³ to their original position, and when the lugs Q reach their original end position in the grooves H², the device is re-set. Thus it will be seen that for re-setting the device it is only necessary to turn the drum C in a reverse direction.

From the foregoing it will be seen that when the safety device is thrown into action the brake-shoes L engage the guides N first quickly, and immediately after that with a gradually increasing force, so that during the first period the cage is prevented from falling a great distance and during the second period the cage is gradually brought to a stop and securely held against movement, thus preventing injury to the occupants of the cage.

Having thus described my invention, I claim as new and desire to secure by Letters Patent:

1. A safety device for elevators, comprising a safety rope, a drum on which are fastened the ends of the safety rope, nuts on which the drum is journaled, screw-rods screwing in the said nuts and provided with heads, brake-levers adapted to be actuated by the said heads, and means for imparting a bodily sliding motion to the said nuts, screw-rods and heads, to apply the brake-levers quickly on rotating the drum.

2. A safety device for elevators, comprising a safety rope, a drum on which are fastened the ends of the safety rope, nuts on which the drum is journaled, screw-rods screwing in the said nuts and provided with heads, brake-levers adapted to be actuated by the said heads, means for imparting a bodily sliding motion to the said nuts, screw-rods and heads, to apply the brake-levers quickly on rotating the drum, and means for holding the nuts against turning during their bodily movement.

3. A safety device for elevators, comprising a fixed guide, brake-levers, means for actuating the said brake-levers, brake-shoes mounted to slide on the ends of the said brake-levers, and springs interposed between the said brake-levers and the shoes.

4. A safety device for elevators, comprising a fixed guide, a brake-lever, a brake-shoe mounted to slide on the end of the brake-lever and adapted to engage the said guide, a spring interposed between the brake-lever and the brake-shoe, and means for actuating the said lever, first quickly and with a slight compression of the spring, and then slowly and with a more powerful compression of the spring.

5. A safety device for elevators, comprising a drum, a safety rope for turning the drum, brakes, members connected with the drum, rods for operating the brakes, said rods being connected with the members to move endwise, and means for first imparting a bodily endwise movement to the members and rods so as to apply the brakes quickly on rotating the drum and subsequently rotating said members in unison with the drum to impart endwise movement to the rods for actuating the brakes slowly and more powerfully.

6. A safety device for elevators, comprising a drum, a safety rope, the ends of which are secured to the drum, brake levers, members on which the drum is journaled, rods having heads at their outer ends for operating the brake levers, said rods being carried by the members and connected therewith to move endwise, and means for first imparting a bodily endwise movement to the members and rods to apply the brakes quickly on rotating the drum and subsequently rotating the said members in unison with the drum to impart endwise movement to the rods for actuating the brake levers slowly and more powerfully.

7. A safety device for elevators, comprising a safety rope, a drum on which are fastened the ends of the safety rope, nuts on which the drum is journaled, screw-rods screwing in the said nuts and provided with heads, brake-levers adapted to be actuated by the said heads, means for imparting a bodily sliding motion to the said nuts, screw-rods and heads, to apply the brake-levers quickly on rotating the drum, and means for subsequently rotating the nuts in unison with the drum, to cause the screw-rods to travel in the nuts, for actuating the brake-levers slowly and more powerfully.

8. A safety device for elevators, comprising fixed guides, sets of brake-levers for engaging the said guides, screw-rods having heads for actuating the said brake-levers, nuts in which screw the said screw-rods, a drum in which the nuts are mounted to turn and to slide, in the direction of their axes, and means for imparting a primary sliding motion to the said nuts on rotating the drum and for causing the nuts to subsequently rotate with the drum.

9. A safety device for elevators, comprising fixed guides, sets of brake-levers for engaging the said guides, screw-rods having heads for actuating the said brake-levers, nuts in which screw the said screw-rods, a drum in which the nuts are mounted to turn and to slide in the direction of their axes, means for imparting a primary sliding motion to the said nuts on rotating the drum and for causing the nuts to subsequently rotate with the drum, and means for holding the nuts against turning during their sliding motion.

10. A safety device for elevators, comprising fixed guides, sets of brake-levers for engaging the said guides, screw-rods having heads for actuating the said brake-levers, nuts in which screw the said screw-rods, a drum in which the nuts are mounted to turn and to slide in the direction of their axes, and pins on the said drum, engaging cam-grooves on the said nuts, for imparting first a sliding motion to the said nuts and subsequently a turning motion on rotating the drum.

11. A safety device for elevators, comprising fixed guides, sets of brake-levers for engaging the said guides, screw-rods having heads for actuating the said brake-levers, nuts in which screw the said screw-rods, a drum in which the nuts are mounted to turn and to slide in the direction of their axes, pins on the said drum, engaging cam-grooves on the said nuts, for imparting first a sliding motion to the said nuts and subsequently a turning motion on rotating the drum, and spring-pressed slidable collars having lugs engaging external lengthwise-extending slots in the said nuts, to hold the latter from turning, the said slots terminating in screw-threads.

In testimony whereof I have signed my name to this specification in the presence of two subscribing witnesses.

JOHN N. ANDERSON.

Witnesses:
THEO. G. HOSTER,
JNO. M. RITTER.